Figure 1:
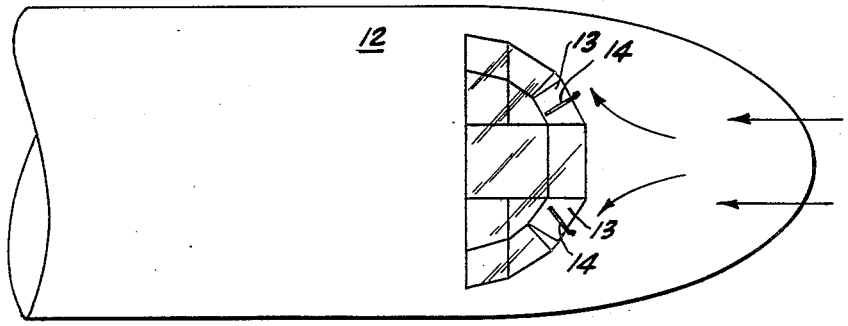

Dec. 3, 1957   P. F. ELLIOTT ET AL   2,814,820
WINDSHIELD WIPER BLADE
Filed Sept. 1, 1953

INVENTORS
PAUL F. ELLIOT AND
BARTON E. GILLER
BY Edwin Coates
ATTORNEY

100
United States Patent Office 2,814,820
Patented Dec. 3, 1957

2,814,820

WINDSHIELD WIPER BLADE

Paul F. Elliott, Anaheim, and Barton E. Giller, Whittier, Calif., assignors to Douglas Aircraft Company, Inc., Santa Monica, Calif.

Application September 1, 1953, Serial No. 377,856

9 Claims. (Cl. 15—245)

This invention relates to windshield wipers and more particularly to a wiper blade backing member which deflects air past and imparts rigidity to the rubber or other flexible, resilient material employed in the wiping portion of the blade.

At present, the wiper blades employing a U-shape backing member of relatively thin or low gauge sheet metal are suitable for automobile and other relatively low speed vehicles and have been satisfactory on many aircraft. On aircraft however, when such blades are used, it is necessary that the blade be caused to sweep transversely of the direction of air flow in order that excessive wind loads on the side of the blade may be avoided. If the wind loads encountered by aircraft and other high speed vehicles were imposed on the blade side, the power of the blade motor would have to be increased to a degree that, in practice, would be prohibitive. In addition, the wind loads against the blade side would produce forces of sufficient magnitude to cause bending of the thin metal backing. A further difficulty is presented in considering the effects of wind loads on the side of a blade. This difficulty resides in the tendency of the wind to "get under" the blade and decrease the pressure of the blade against the surface to be wiped. It is evident that to overcome this latter difficulty it would be necessary to proportionately increase the strength of the blade contact pressure spring.

Certain aircraft of recent design incorporate windshields so situated that the wiper blades used to sweep thereacross must move into the airstream, that is, with their sides exposed to the force of the air. Prior to the present invention it was necessary in these aircraft to increase the rigidity of the blade backing member, the power of the blade motor and the strength of the spring used to press the blade against the wiped surface.

It is a feature of this invention that by the use of a modified blade backing member the above mentioned necessity of a stronger motor and spring is obviated. The shape of the novel blade back of this application provides a surface which will deflect the air past the blade side and utilize a component of the force of the air to increase the pressure of the blade against the windshield. While there does remain some of the wind forces against blade side, this novel backing will provide adequate reinforcement to eliminate the possibility of any bending in the blade.

Another feature of this invention is that there is provided a blade backing which may be conveniently clipped over the metal U-shaped backing of commercially available blades or the backing herein disclosed may be applied directly to the flexible wiping material. Thus, in mass production where economy is a prime consideration, the intermediate or U-shaped backing member may be eliminated. On the other hand, in the instance where the user has but infrequent need for this specific blade, the conventional blade is easily converted by the mere addition of the novel reinforcing backing member.

It is still another feature of this invention that there is provided an article having the above advantages which, nevertheless, is of relatively simple design and which requires but few metal working operations in its fabrication.

Figure 2:
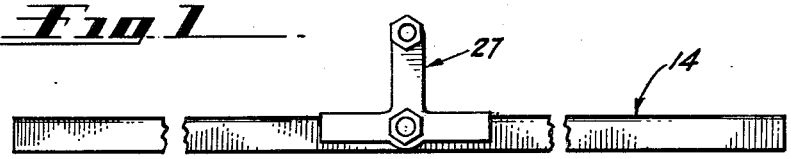
Figure 3:
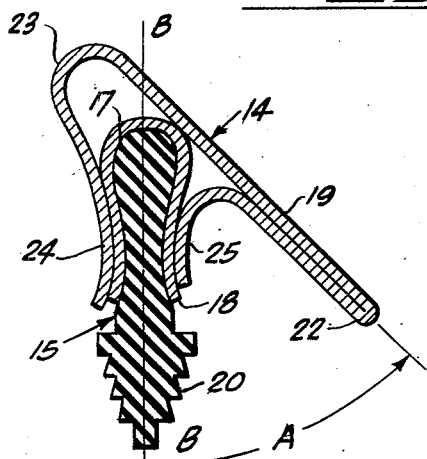
Figure 4:
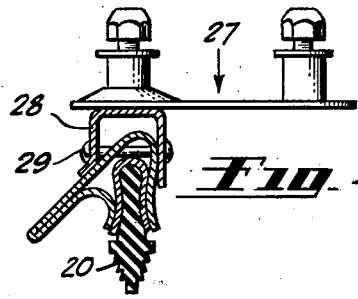
Figure 5:
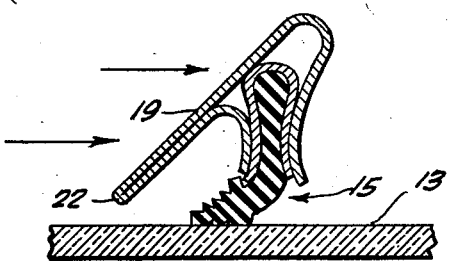
Figure 6:
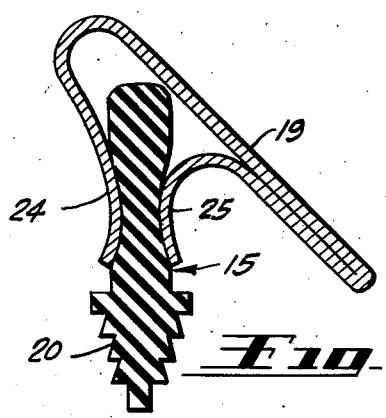

Other features and advantages afforded by the present invention will be made apparent from the following description taken in conjunction with the accompanying drawing in which: Figure 1 is a top plan view of the nose portion of an aircraft showing the position of the blade in use; Figure 2 is a top plan view of the novel backing with its blade holder lever assembly; Figure 3 is a cross-sectional view of the blade backing member applied over the usual U-shaped backing of a blade; Figure 4 is a fragmentary sectional view showing the manner of attaching the blade holder lever assembly to the blade back; Figure 5 is a cross-sectional view showing the relation of the wind deflecting portion of the back to the windshield when the blade is in use, and; Figure 6 is a cross-sectional view of the improved blade backing applied directly to the flexible wiping member.

In the aircraft 12 the windshields 13 are so disposed that the air travels across them in a direction indicated by the arrows (Fig. 1). Wipers 14 are arranged to sweep across windshields 13 in a direction generally parallel to the direction of airflow.

The wiper 14 includes a squeegee member 15 of rubber or other suitable elastic material having the major axis of its section designated by line B—B. The back or outer end 17 of squeegee 15 is gripped between the flanges of the metal U-shaped backing member 18. To backing member 18 is attached an air deflecting member. This air deflecting and reinforcing member is formed from sheet metal. However it will be obvious that it could readily be formed as an extrusion or by other known processes. This member comprises a flat, air deflecting portion 19 disposed at an angle A in the range of 40 to 50 degrees from the major axis B—B of the squeegee section. Deflecting portion 19 extends inwardly and terminates in a leading edge which, viewing Fig. 5, is spaced a sufficient distance from axis B—B so as not to contact the inner end 20 of the squeegee 15.

The leading edge 22 of deflecting portion 19 will sweep in a plane very close to and parallel with the plane of the windshield and not interfere with the action of the squeegee. In this manner substantially all of the air, when flowing in the direction of the arrows (Fig. 1) across the windshield, will be intercepted by this deflecting surface 19 before any undesirable effects are produced on the side of the squeegee 15 and backing 18. The deflected air will flow smoothly across portion 19 and over trailing edge 23 of member 14. The impact force of the air will thus be substantially reduced and additionally, a component of this force will be in a direction normal to and toward the plane of the windshield being wiped. This force component will urge squeegee 15 into contact with the wiped surface, thereby eliminating the necessity of a strong pressure applying means usually incorporated in the wiper blade support arm.

Extending downwardly from trailing edge 23 is blade gripping portion 24 opposed by the other blade gripping portion 25 bent away from the plane of deflecting surface 19. If the deflecting member is formed of a resilient or springy material, it may first be shaped, then gripping portions 24, 25 snapped into place over backing 18. If the deflecting member be made of material not having the quality of resilience, grippers 24, 25 may be bent into shape with backing member 18 positioned therebetween.

In the modification depicted in Fig. 6, deflecting member 14 is shown as applied directly to squeegee 15, there being no intermediate backing member. It is apparent that this form of the invention is advantageous as the step of forming the intermediate backing, present in the form shown in Fig. 3, is eliminated. That form shown in Fig. 3 has the advantage that when it is desired to convert the wipers now employing only the U-shape backing, it is merely necessary to clip the deflector over such backing.

This invention affords the advantage that through the use of the novel backing incorporating a wind deflector some flexibility in the placement and type of the wiper actuating means is provided. In the past it was a requirement that the wiper blade be parallel or in line with the air flow.

As shown in Fig. 4 the blade holder lever assembly 27 is attached to the air deflector by means of channel 28. Rivet 29 passes through the flanges of channel 28 and through the upper portion of the air deflecting member slightly above the outer extremity of squeegee 15 and backing 18.

Fig. 5 shows the relation of the inner or leading edge 22 of deflecting surface 19 to the flexed portion of squeegee 15 when the wiper is in use. In addition it is to be noted the leading edge 22 of the deflector 19 is adjacent the surface of windshield 13 whereby substantially all the air flowing in the direction of the arrows (Fig. 5) will flow over the top of the wiper.

It will be apparent to those skilled in the art that various changes and modifications may be made in the device as disclosed without departing from the spirit of the invention and it is intended that all such changes and modifications shall be embraced within the scope of the following claims.

We claim:

1. A windshield wiper blade comprising: a first backing member channel shaped in cross section; a squeegee body having one edge disposed in the channel and gripped by said backing member, the other edge of said squeegee presenting a wiping face free to flex when urged against the surface of the windshield; a second backing member including a planar air deflecting portion disposed at an acute angle to an axis through the said edges of the squeegee and intersecting said axis beyond the gripped edge; said deflecting portion terminating in an outer trailing edge and an inner leading edge, said inner edge and the outer extremity of said wiping face being substantially equidistant from the plane of the windshield whereby, when said face flexes, the inner edge will sweep close to but not touch the surface being wiped; and a finger extending from each of said edges of the deflecting portion and respectively engaging opposite sides of said first backing member.

2. A windshield wiper blade backer adapted to be attached to a non-wiping portion of the flexible material of the wiper to impart rigidity thereto and to deflect an air stream therepast, comprising: a member having a substantially planar portion including an air deflecting surface terminating in an inner leading edge and an outer trailing edge; and fingers carried by said member, each of said fingers being respectively joined to said upper and lower edges, said fingers being situated on the side of the planar portion opposite the deflecting surface and having opposed gripping portions adapted to hold the flexible wiping material therebetween with a major axis of a cross-section of the wiping material at an angle in the range of 40° to 50° to the planar portion.

3. A windshield wiper blade comprising: a blade backing member including a generally planar portion having an outwardly facing air deflecting surface adapted to be disposed transversely of normal airflow in a plane approximately bisecting the angle between the surface of the windshield and a plane normal to said windshield; said deflecting surface having an inner edge normally adjacent but not in contact with said windshield whereby air moving across said windshield into contact with the deflecting surface will be diverted away from said windshield; a squeegee disposed on the side of the planar portion opposite said deflecting surface; and fingers extending from the planar portion and supporting said squeegee, said fingers maintaining the squeegee in a position approximately normal to the windshield surface.

4. For use in aircraft utilizing a windshield wiper blade sweeping in a direction parallel with but opposed to the flow of air across the windshield whereby one side of the blade is subjected to the force of the air, an air deflecting blade backing comprising: a generally flat portion presenting a deflecting surface against which the flow of air impinges, said surface having a leading edge positioned to move adjacent the windshield surface but not in contact therewith and a trailing edge over which the air flows after striking the deflecting surface; said deflecting surface forming an angle of approximately 45° with the windshield surface; and supporting means integral with said flat portion for supporting a windshield contacting squeegee, said supporting means extending from the side of said flat portion opposite the deflecting surface whereby the squeegee will be sheltered from the force of the air.

5. A windshield wiper assembly comprising: a flexible squeegee member having an inner windshield contacting portion and an outer portion to be attached to a stiffening and supporting backing; a channel backing having a base and flanges, the flanges being respectively in gripping engagement with opposite sides of the outer squeegee portion; a second backing member having means in clamping engagement with the channel flanges, said means including first and second finger-like portions, the first finger-like portion extending along one channel flange to a point beyond the channel base; a planar air deflector into which the first finger-like portion merges, said deflector passing across the channel base and intersecting the axis of symmetry of the channel at an angle of approximately 45° thence extending to an inner point laterally adjacent the outermost extremity of the windshield contacting portion of the squeegee, the said second finger-like portion engaging the other channel flange and being attached to the inner part of the deflector.

6. An air deflecting windshield wiper comprising: a thin blade of resilient material having an outer portion to be supported by a backing member and an inner portion adapted to flex when in engagement with the windshield to be wiped; a backing member including two opposed blade supporting parts between which the outer blade portion is gripped and an air deflecting part to divert air away from the blade; said deflecting part intersecting an axis through the inner and outer blade portions at an angle in the range of 40°–50° and at a point beyond the outer blade portion; said deflecting part having outer and inner edges from which the aforementioned blade supporting parts respectively extend.

7. A windshield wiper blade comprising: a flexible blade type squeegee having outer and inner portions, a line through said portions determining the major axis of the squeegee section, said inner portion being adapted to flex away from said axis when said squeegee is urged into contact with the windshield with said major axis normal to said windshield; a backing member including a planar deflector terminating in an inner leading edge and an outer trailing edge, said leading edge being positioned approximately in a plane parallel with the windshield and passing through the outermost point of the flexing portion of the squeegee, and being spaced along said plane from said axis a distance slightly greater than the maximum displacement of the flexing portion; said deflector slanting at an angle of approximatetly 45° to the axis of the squeegee section and passing through said axis at a point beyond the outer squeegee portion; and a finger extending from each of said deflector edges and respectively engaging opposite sides of the said outer squeegee portion.

8. A windshield wiper blade comprising: a squeegee member having inner and outer edge portions, at least the inner edge portion being flexible and adapted to contact a windshield for wiping action, the outer edge portion being adapted to be gripped by a backer; a wind deflector member including a relatively flat elongate deflecting surface and means for attaching said deflector member to said squeegee member; said means being so arranged as to retain said deflector member with the plane of its deflecting surface at an acute angle to the plane containing the inner and outer edge portions of said squeegee member and with the innermost edge of the deflector laterally adjacent the medial portion of said squeegee member.

9. An air deflecting windshield wiper comprising: an elongated squeegee type flexible wiper blade having an outer portion to be rigidly supported and an inner portion adapted to flex when drawn in wiping contact across a windshield; means for supporting and stiffening the outer portion of the blade, said means including a planar air deflecting surface intersecting an axis through the outer and inner portions at an acute angle; leading and trailing edges on said deflecting surface, the leading edge being spaced laterally of the inner flexing blade portion a distance greater than the maximum displacement of the inner blade portion when flexed; and a finger extending from each of said edges to respectively opposite sides of the squeegee and in supporting relation therewith.

References Cited in the file of this patent

UNITED STATES PATENTS

| | | |
|---|---|---|
| 1,950,588 | Anderson | Mar. 13, 1934 |
| 2,243,576 | Otto | May 27, 1941 |

FOREIGN PATENTS

| | | |
|---|---|---|
| 402,189 | Great Britain | of 1933 |